United States Patent
White

(10) Patent No.: US 12,163,800 B2
(45) Date of Patent: Dec. 10, 2024

(54) TURNING PATH GUIDANCE SYSTEM FOR VEHICLES

(71) Applicant: Robert Bosch GmbH, Stuttgart (DE)

(72) Inventor: Michael White, Livonia, MI (US)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 17/331,461

(22) Filed: May 26, 2021

(65) Prior Publication Data
US 2022/0381579 A1    Dec. 1, 2022

(51) Int. Cl.
*G01C 21/36*  (2006.01)
*B60W 40/06*  (2012.01)

(52) U.S. Cl.
CPC ......... *G01C 21/3697* (2013.01); *B60W 40/06* (2013.01); *G01C 21/3655* (2013.01); *G01C 21/3667* (2013.01); *B60W 2420/403* (2013.01); *B60W 2420/408* (2024.01); *B60W 2540/18* (2013.01)

(58) Field of Classification Search
CPC ............ G01C 21/3697; G01C 21/3655; G01C 21/3667; B60W 40/06; B60W 2420/42; B60W 2420/52; B60W 2540/18
See application file for complete search history.

(56) References Cited

U.S. PATENT DOCUMENTS

| | | | |
|---|---|---|---|
| 9,428,186 B2 * | 8/2016 | Breed | B60W 30/09 |
| 9,522,699 B2 | 12/2016 | Raad et al. | |
| 9,688,308 B2 * | 6/2017 | Lee | B62D 15/025 |
| 9,849,911 B2 | 12/2017 | Lee et al. | |
| 9,896,130 B2 | 2/2018 | Ghneim et al. | |
| 10,167,015 B2 | 1/2019 | Rust et al. | |
| 10,357,716 B2 * | 7/2019 | Tipping | A63F 13/5375 |
| 10,471,992 B2 | 11/2019 | Brennan et al. | |
| 10,589,783 B2 * | 3/2020 | Allan | B62D 5/0457 |

(Continued)

FOREIGN PATENT DOCUMENTS

WO    2018/115963 A2    6/2018

OTHER PUBLICATIONS

Katrakazas et al., Real-time motion planning methods for autonomous on-road driving: State-of-the-art and future research directions, https://www.sciencedirect.com/science/article/pii/S0968090X15003447#b0535 (Year: 2015).*

(Continued)

*Primary Examiner* — Aryan E Weisenfeld
(74) *Attorney, Agent, or Firm* — Maginot, Moore & Beck LLP

(57) ABSTRACT

A method of providing turning path guidance for a vehicle includes determining parameters of a turn region of a roadway using a controller of the turning path guidance system. The parameters include lane data and turning angle data. Positions of objects in and around the turn region of the roadway are detected using a sensor system of the vehicle. A map of the turn region is generated based on the lane data, turning angle data and that shows the detected objects using the controller. A turning path for the vehicle for navigating the turn in the turn region that avoids the detected objects is determined using the controller. The map with the turning path is displayed on a display screen in the vehicle.

8 Claims, 3 Drawing Sheets

(56) References Cited

U.S. PATENT DOCUMENTS

| | | | |
|---|---|---|---|
| 2005/0196256 A1* | 9/2005 | Rodenkirch | B64F 1/227 |
| | | | 414/426 |
| 2016/0200359 A1* | 7/2016 | Boeck | B62D 15/027 |
| | | | 701/41 |
| 2017/0247032 A1 | 8/2017 | Lee et al. | |
| 2018/0129209 A1* | 5/2018 | Chen | G05D 1/0212 |
| 2018/0178721 A1* | 6/2018 | Ikedo | B60R 16/0231 |
| 2018/0186403 A1* | 7/2018 | Zhu | G05B 19/402 |
| 2020/0180619 A1 | 6/2020 | Lee | |
| 2021/0039715 A1* | 2/2021 | Ferrer | H04W 4/46 |
| 2021/0080961 A1 | 3/2021 | Shenai et al. | |
| 2021/0171099 A1* | 6/2021 | Yamamoto | B62D 13/06 |

OTHER PUBLICATIONS

Valiente, Controlling Steering Angle for Cooperative Self-driving Vehicles utilizing CNN and LSTM-based Deep Networks, https://ar5iv.labs.arxiv.org/html/1904.04375 (Year: 2024).*
Katrakazas (Year: 2015).*
Valiente (Year: 2024).*

* cited by examiner

TURNING PATH GUIDANCE SYSTEM FOR VEHICLES

TECHNICAL FIELD

This disclosure relates to the field of vehicles and, in particular, to driving assistance systems and methods for vehicles.

BACKGROUND

An articulated vehicle is a vehicle having two sections with a front section, such as a cab, truck, or other vehicle, that pulls a rear section, such as a trailer. The front section and rear section are attached by a hitch which forms a pivot joint and allows the vehicle to turn more sharply. Due to the hitch in the middle, which connects the front and rear sections together, the geometry and dynamics of the articulated vehicle must be taken into account by a driver while navigating roadways. This is particularly true when turning the vehicle. The same is true for non-articulated vehicles, especially, long, single section vehicles, such as buses. As a vehicle turns, the innermost and outermost points of the vehicle define a swept path which is the area of ground swept by all parts of the vehicle as it moves through the turn. The swept path width is typically greater than the width of the vehicle during the turn because the rear wheels of the vehicle offtrack with respect to the front wheels of the vehicle.

The swept path width must be taken into consideration by a driver when making a turn in order to keep the vehicle in the correct lane as much as possible while making the turn. Turning too wide could result in the vehicle moving into an adjacent lane which may be occupied by other vehicles. Turning too sharp could result in the vehicle cutting the corner and crossing over a curb which could damage the vehicle or result in collisions with objects that are on the side of the road, such as light poles, utility poles and the like. The difficulty of navigating a turn in a vehicle, especially articulated vehicles and long, single section vehicles, can also result in drivers taking turns slowly which can tie up traffic.

What is needed is a system or method of facilitating the navigation of turns and curves for the drivers of articulated vehicles and longer vehicles in order to avoid the aforementioned difficulties.

SUMMARY

A method of providing turning path guidance for a vehicle includes determining parameters of a turn region of a roadway using a controller of the turning path guidance system, the parameters including lane data and turning angle data; detecting positions of objects in and around the turn region of the roadway using a sensor system of the vehicle; generating a map of the turn region based on the lane data, turning angle data and that shows the detected objects using the controller; determining a turning path for the vehicle for navigating the turn in the turn region that avoids the detected objects using the controller; and displaying the map with the turning path on a display screen in the vehicle.

A turning guidance system for a vehicle includes a sensor system on the vehicle configured to detect objects in and around a turn region of a roadway. The vehicle also includes a navigation system configured to generate navigation data pertaining to at least one roadway in the turn region. The vehicle also includes a display screen. A controller of the turning guidance system is configured to determine parameters of the turn region including lane data and turning angle data; generate a map of the turn region based on the lane data, turning angle data and that shows the detected objects in corresponding positions of the map; determine a turning path for the vehicle for navigating the turn in the turn region that avoids the detected objects; and cause the map with the turning path to be displayed on the display screen.

DETAILED DESCRIPTION

Figure 1:
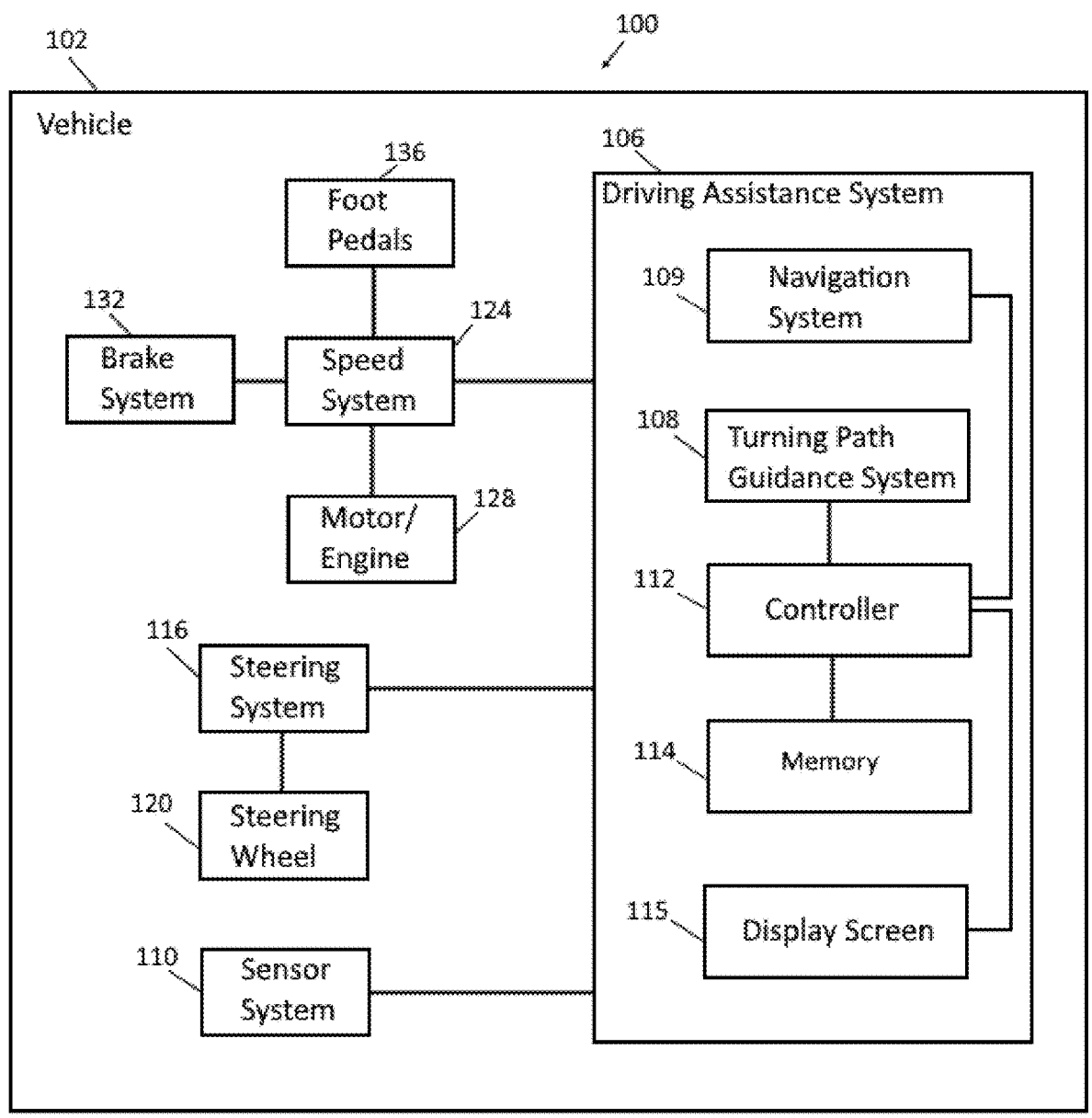
FIG. 1 is a schematic depiction of a vehicle having a turning path guidance system in accordance with the present disclosure.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

As shown in FIG. 1, a system 100 includes a vehicle 102. In one embodiment, the vehicle 102 is an articulated vehicle having a front section and a rear section connected by a coupling such as a hitch which forms a pivot point for the vehicle, such as a semi-truck, tractor trailer, an articulated bus, or any vehicle towing a trailer. In another embodiment, the vehicle 102 is non-articulated vehicle including long, single section vehicles, such as a bus or long construction vehicle. However, the disclosure is applicable to substantially any type of vehicle including articulated and non-articulated vehicles. The vehicle 102 may have any level of automation and/or autonomy that includes automatic steering and braking control.

The vehicle 102 includes a driving assistance system 106. In accordance with the disclosure, the driving assistance system 106 includes a turning path guidance system 108 that is configured to use sensor inputs from various sensors of a sensor system 110 on the vehicle (Ultrasonic, Video, Radar, LIDAR) to determine the positions of objects (e.g., poles, curbs, vehicles, pedestrians) in the vicinity of a location on a road or street at which a turn is required to be made by the vehicle and plan a path for the driver to safely and efficiently negotiate the turn. The turn could be at an intersection where the vehicle is to turn from one roadway onto another. The turn could also be a change of direction, e.g., an angled turn, curve, roundabout, or the like, along a roadway. The turning path guidance system 108 detects the current position of the vehicle 102 on the road and processes the sensor input to determine positions of objects in the vicinity of a turn to identify lanes and objects in the vicinity of the turn. A controller 110 of turning path system 108 then calculates a turning path for navigating the turn based on the current steering angle, the lane position and orientations, positions of the objects, size of the vehicle (including cab and trailer in the case of an articulated vehicle), turn radius, pivot point, and the like, and displays a map of the turn region on a display screen 104 in the driver's view within the vehicle 102. The display of the turn region may show the lanes of the roadway, the current position of the vehicle on the roadway, and representations of objects placed at corresponding positions of the map. The calculated turning path is overlaid on the map showing a desired steering angle range to guide the driver in manually navigating the turn.

Referring again to FIG. 1, the vehicle includes a steering system 116 and a steering wheel 120, a speed system 124 operably connected to a motor 128, a brake system 132, and foot pedals 136. The steering system 116 is configured control a steering angle of the vehicle 102 so that the vehicle 102 can be automatically and/or manually maneuvered around corners and along roads. The steering system 116 moves, pivots, and/or rotates wheels of the vehicle 102 relative to a chassis of the vehicle 102 to steer the vehicle 102. The steering system 116 may be controlled by the driving assistance system 106 so that the steering angle of the vehicle 102 is automatically electronically controlled. The steering system 116 may also be manually controlled by an operator of the vehicle 102 using the steering wheel 120, which is operably connected to the steering system 116. The steering wheel 120 is also referred to herein as an input device of the vehicle. The steering system 116 is configured to detect the current steering angle of the vehicle 102 and output the steering angle to the controller. The operator of the vehicle 102 is also referred to as a driver. As used herein, the steering angle of the vehicle 102 is an angle of the wheels of the vehicle relative to a centerline of the vehicle 102.

The motor 128 is configured to generate a drive torque for moving the vehicle 102. In one embodiment, the drive torque is transmitted to the wheels of the vehicle 102 through a transmission. Alternatively, the drive torque is directly transmitted to the wheels, and the vehicle 102 does not include a transmission. In a specific embodiment, the motor 128 is an electric motor supplied with electrical energy from a battery of the vehicle 102. In another embodiment, the motor 128 is an internal combustion engine that burns a fuel for generating the drive torque.

The brake system 132 is configured to generate a braking force for slowing the vehicle 102 and for maintaining the vehicle 102 in a stopped position. The brake system 132, in one embodiment, is a hydraulic brake system including disc brakes.

With reference to FIG. 1, the speed system 124 is configured to automatically control a speed of the vehicle 102. For example, the speed system 124 controls the motor 128 to generate a desired magnitude of the drive torque for moving the vehicle 102 at a desired speed. The speed system 124 may also control the brake system 132 for automatically slowing the vehicle and for automatically bringing the vehicle 102 to a controlled and comfortable stop.

The foot pedals 136 are operably connected to the speed system 136 and are configured to enable an operator of the vehicle 102 to manually control the speed system 124 and to manually control the speed of the vehicle 102. The foot pedals 136 include at least an acceleration pedal for controlling the magnitude of the drive torque of the motor 128, and a brake pedal for selectively activating the brake system 132 for slowing or stopping the vehicle 102.

As shown in FIG. 1, the driving assistance system 106 includes a controller 112, a navigation system 109, a sensor system 110, a memory 114, and a display screen 115. The navigation system 109 is configured to provide at least vehicle position data, map data, and navigation data to the controller of the driving assistance system. In one embodiment, the navigation system 109 is a satellite navigation system that uses the global positioning system (GPS), the global navigation satellite system (GNSS), and/or any other satellite-based navigation system to generate the vehicle position data. The vehicle position data corresponds to a position of the vehicle on the Earth.

The map data corresponds to a roadway map of roadways that are available to the vehicle 102. The navigation system 109 is configured to use the vehicle position data to determine the position of the vehicle relative to the map data. Accordingly, the navigation system 109 is configured to determine the roadway on which the vehicle is currently being operated using the vehicle position data and the map data.

The navigation data, in an exemplary embodiment, corresponds to a route from a starting point to a destination using the available roadways. In one embodiment, the operator of the vehicle 102 configures the navigation system 109 with a desired destination, and the navigation system 109 automatically generates the navigation data for navigating the vehicle 102 to the destination. As described herein, the driving assistance system 106 typically automatically controls the speed and/or the steering angle of the vehicle 102 to navigate the vehicle 102 to the destination based on the route data.

The navigation system 109 is configured to apply data layers to the map data for navigating the vehicle. For example, the navigation system 109 may include a digital traffic layer that includes real-time traffic data (not shown). In determining the navigation data for navigating the vehicle to the destination, the navigation system 109 processes the traffic data layer so that the vehicle is navigated using an optimized route that minimizes traffic delays and slow-downs.

The driver assistance system includes a sensor system 110 for detecting parameters to aid in performing various functions of the driver assistance system. The sensor system 110 includes at least one image sensor mounted at one or more locations on or in the vehicle 102. The at least one image sensor may comprise a visible light sensor. In another embodiment, the image sensor is configured as a thermal imaging device configured to generate the image data based on thermal radiation and/or an infrared radiation. In some embodiments, the sensor system 110 includes a LIDAR (light detection and ranging) system, an ultrasonic ranging system and/or a radar system that is configured to generate image data or object detection data as an alternative to or in addition to image data generated by the at least one image sensor.

The sensors of the sensor system 110 are configured to generate image data corresponding to images of the road ahead of the current position of the vehicle 102 and includes data corresponding to road edges and road surface markings that identify lanes of travel, such as striped lines and double lines. The field of view extends to both road edges. Exemplary road surface markings include painted markings dividing and/or identifying lanes of travel. Sensor data from the sensor system 110 may also be used to detect objects and/or hazards in and around the roadway.

The controller 112 of the driving assistance system 106 is provided as at least one microcontroller and/or microprocessor and is configured to perform various tasks using the data and inputs from the other components of the system. The controller 112 is configured to receive navigation data from the navigation system 109, steering data (e.g., steering angle) from the steering system 116, speed data from the speed control system 124, and sensor data from the sensor system 110 as well as data from other driver inputs such as the steering wheel and the foot pedals.

The controller 106 is configured to process the input(s) from the sensor system 110 to determine to determine the position and orientation of lanes of the roadway, to detect objects in and around the roadway, such as other vehicles, light posts, pedestrians, fire hydrants, mailboxes and the like, and to determine a position and orientation of the vehicle with respect to the lanes of the roadway.

As part of the driver assistance system 106, the controller 106 is configured to automatically control the steering angle and the speed of the vehicle 102 based on at least the navigation data from the navigation system, the map data, the vehicle position data, and the lane position. For example, the controller 106 is configured to control the steering system 116 to automatically position the vehicle in the center of a lane of the roadway. The controller 106 is also configured to control the speed of the vehicle 102 by controlling the drive torque of the motor 128 and by controlling the brake system 132. In certain SAE levels, such as SAE 3 through SAE 5, the driving assistance system navigates the vehicle 102. For example, the controller may be configured to process the data from the sensor system 110 to detect objects and hazards in the roadway and automatically control the steering and speed or braking of the vehicle to avoid any detected objects or hazards.

Figure 2:
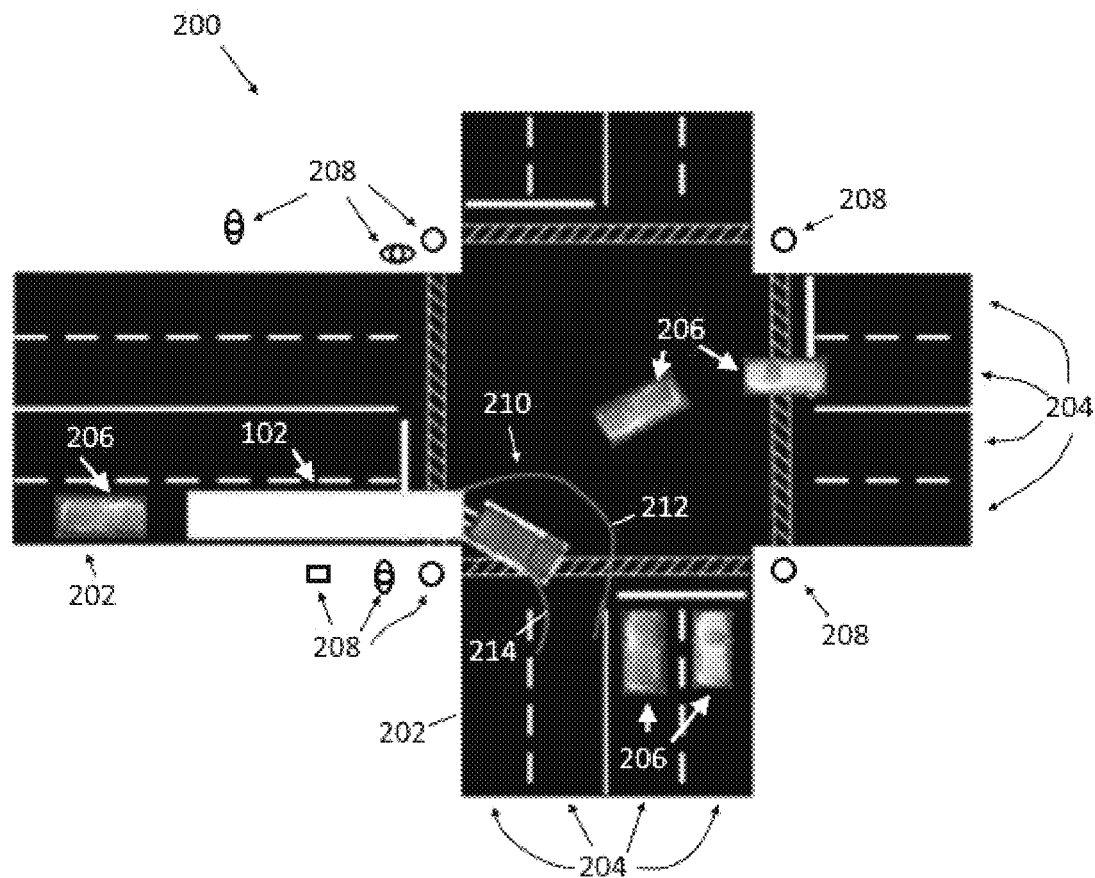
FIG. 2 is an illustration of a map generated by the turning path guidance system of FIG. 1 showing a turning path for display on a display screen of the turning path guidance system of FIG. 1.

As part of the turning path guidance system 108, the controller 106 is configured to process the sensor data from the sensor system 110, steering data (e.g., steering angle) from the steering system 116, speed data from the speed system 124, and navigation data from the navigation system 109 to generate a map of a turn region. An exemplary map 200 is depicted in FIG. 2. As depicted in FIG. 2, the map that shows the roadway(s) 202, the lanes 204 of the roadway, other vehicles 206 in the lanes 204 in the turn region 200, and objects 208 such as light posts, utility poles, pedestrians, fire hydrants, mailboxes, and the like, in their corresponding positions in the turn region 200.

The turn region 200 includes at least a portion of the roadway(s) 202 leading into and leading away from a turn to be performed by the vehicle 102. The turn can be a turn from one roadway onto another roadway, e.g., at an intersection, such as depicted in FIG. 2. The turn can also be a turn or curve on a single roadway. The turn can also be a circular roadway, such as a roundabout.

The controller 106 is configured to display the map on the display screen 115 that is in the main compartment of the vehicle 102 where it can be viewed by the driver. The display screen 115 can be built into the dashboard of the vehicle or can be attached on or in front of the dashboard. Any suitable type of display screen may be used, such as LCD screen, LED screen, OLED screen, plasma screen, and CRT screen displays.

The controller 106 is also configured to determine the current position of the vehicle 102 with respect to the roadway 202 and to display the vehicle 102 on the map at its corresponding position and orientation. The position of the vehicle 102 as well as other moving objects on the map, such as other vehicles, pedestrians, bicyclists and the like are continuously updated by the controller 106 using the sensor data from the sensor system 110.

To aid a driver in manually navigating a turn in the vehicle 102, the controller 106 is configured to determine a turning path 210 through the turn that will reasonably maintain the vehicle 102 within its lane and avoids going off the road or onto a curb and avoids objects 208 in and around the roadway 208. The turning path 210 is determined by taking into account the current steering angle, the length and width of the vehicle, the distance between the front wheels and the rear wheels, the location of the pivot point between the front wheels and rear wheels in the case of an articulated vehicle, the speed of the vehicle, the current position and orientation of the vehicle, the angle of the turn, the width of the lanes, the swept width of the vehicle, offtrack of the rear wheels with respect to the front wheels, and the positions of other vehicles and objects in and around the turn.

Other factors may also be taken into consideration in determining a desired turning path 210. It is understood that some turns may require that the vehicle veer somewhat into an adjacent lane in order to navigate the turn and avoid going onto the curb or avoid objects along the roadway in the area of the turn. This may done when there are no vehicles in the adjacent lanes or no oncoming traffic. It is also understood that some turns may require that the vehicle go slightly off the road, e.g., cut a corner, in some cases. This is usually done when there is no obstructions or obstacles in that area and in order to avoid vehicles in adjacent lanes or oncoming traffic. These factors may be taken into consideration by the controller to determine the turning path for the vehicle. For example, an absence of vehicles in an adjacent left lane may allow a wider path when navigating a turn so the left maximum steering angle may be increased (i.e., allow the steering wheel to be turned farther to the left when entering a turn) than would be the case if a vehicle was in the adjacent left lane. Similarly, the absence of objects in an adjacent right lane, the provision of space on the right side of the vehicle, such as a shoulder, or the lack of a curb or other objects on the right side of the vehicle may allow the right steering angle to be increased (i.e., allow the steering wheel to be turned farther to the right when entering a turn) than would be the case otherwise.

The controller 106 may be configured to determine the turning path 210 in any suitable manner. In one embodiment, the controller is configured execute a software program stored in the memory 114 (FIG. 1). The memory 114 is a non-transitory computer readable storage medium that is configured to store programmed instructions that when executed by a processor of the controller 106 enable the processor to calculate the turning path 210 based on the factors listed above. Vehicle parameters, such as vehicle size, pivot point location, swept width, and offtracking may be preprogrammed into memory or entered by an operator of the system. Certain factors, such as the degree to which a vehicle is permitted to travel outside of its current lane in making a turn, are based on the desire of the owner/operator of the vehicle and can be preprogrammed as well. Other parameters, such as current steering angle, current speed, turn angle, lane width, and positions of other vehicles and objects are determined from the data received from the various components of the system.

The controller 106 is configured to determine at least a left maximum steering angle and a right maximum steering angle for the turning path 210 when beginning the turn. The terms "left" and "right" are used in reference to the direction of travel or movement of the vehicle. The left maximum steering angle is the farthest that the steering wheel 120 can be turned to the left when entering the turn while still allowing the vehicle to navigate the turn in a desired manner, e.g., by reasonably maintaining the vehicle within its lane and avoiding objects in and around the roadway. The right maximum steering angle is the farthest that the steering wheel 120 can be turned to the right when entering the turn while still allowing the vehicle to navigate the turn in a desired manner. The left maximum steering angle and the right maximum steering angle are different in most cases indicating that more than one path is possible through the turn. It is possible for the left and right maximum steering angles to be the same indicating that there is a single narrow path through the turn.

In the embodiment depicted in FIG. 2, the turning path 210 is displayed on the map on the display screen 115 and includes at least a left boundary line 212 and a right boundary line 214. The left and right boundary lines 212, 214 may be displayed in a manner that enhances the visual perception of the turning path, e.g, by selecting bright colors and/or thicker lines. The turning path boundary lines 212, 214 may be displayed in any suitable manner that is capable of being seen and recognized by a driver of the vehicle 102.

The left boundary line 212 is used to indicate the left maximum steering angle and is positioned to correspond to the path of the left front wheel when entering the turn. Alternatively, the left boundary line 212 may be positioned to correspond to the path of the left front corner of the vehicle. Similarly, the right boundary line 214 is used to indicate the right maximum steering angle and is positioned to correspond to the path of the right front wheel when entering the turn. Alternatively, the right boundary line 214 may be positioned to correspond to the path of the right front corner of the vehicle.

The left boundary line 212 and the right boundary line 214 are displayed in the map to provide a guide for the driver while the turn is navigated. The driver will know that by maintaining the vehicle within the left and right boundary lines 212, 214 on the map on the display screen that the turn will be navigated in a desired manner. The controller 106 may be configured, e.g., through software, to periodically or continuously update the turning path as the driver is navigating the turn. For example, changes in the steering angle of the vehicle and changes in the position of the vehicle with respect to the roadway may necessitate changes in the left and right maximum steering angles which will in turn result in changes in the display of the left and right boundary lines 212, 214 on the map.

Figure 3:
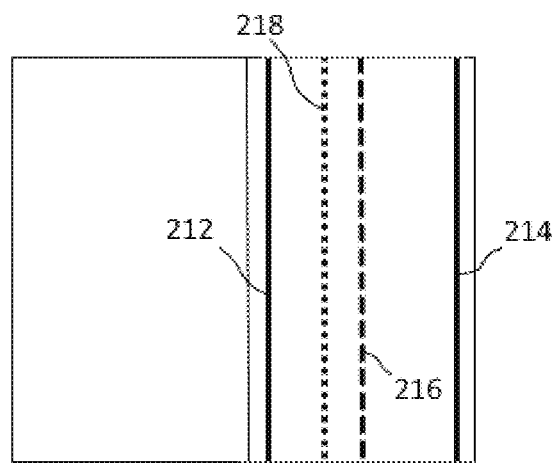
FIG. 3 is a schematic illustration showing the different lines that may be shown with the turning path displayed on the display screen of the turning path guidance system of FIG. 1.

Referring to FIG. 3, in addition to the left and right boundary line 212, 214, the controller 106 may also be configured to determine an optimum path through the turn. As an example, the optimum steering angle through the turn may be the turn path that provides for the most spacing from objects on both sides of the vehicle 102. The parameters for the optimum path may be defined differently by the appropriate parties depending on the application. The optimum path corresponds to the optimum steering angle for navigating the turn which may be determined in a similar manner to the left and right maximum steering angle. In the embodiment depicted in FIG. 3, the optimum path is displayed on the display screen as a single line 216 to show the path that would be taken with the optimum steering angle. FIG. 3 shows a straight path for convenience. The optimum path line 216 is preferably displayed in a manner that is easily distinguishable from the map as well as the boundary lines. For example, the optimum path line 216 may be displayed as a different color line from the boundary lines or as a different type of line, e.g., dashed line as depicted in FIG. 3.

To facilitate the ability of the driver to maintain the vehicle 102 at or near the optimum path, the controller 106 may also be configured to display the current path of the vehicle 102 based on the current steering angle. The current path may be displayed as a single line 218 that is aligned with the center line of the vehicle and reflects the path of the vehicle that would be taken based on the current steering angle. The current path line 218 may be displayed in a manner that is distinguishable from the optimum path line, e.g., by using different colors and/or line types. The driver can see the difference between the optimum path line and the current path line on the map and adjust the steering angle of the vehicle in an effort to match the current path line 218 with the optimum path line 216.

The controller 106 may be configured to generate an alert or alarm for the driver in certain circumstances. For example, the controller 106 may be configured to generate an alert if the current steering angle of the vehicle would result in the vehicle path going outside of the desired turning path, and/or if the controller detects that the current steering angle is greater than the left or right maximum steering angle. Any suitable type of alert may be generated, such as an audible alarm, e.g., a beep, buzz, or spoken words, that may be used to indicate that the driver should adjust the steering angle of the vehicle. Visual alerts or alarms may also be used, such as text displayed on the screen indicating the nature of the alert and/or the steps to take to correct the vehicle path.

The controller 106 may also be configured to generate an alert or alarm if the controller determines that a vehicle or moving object, such as a pedestrian, move near or into the turning path of the vehicle. In this case, the alert or alarm may be used to indicate that the driver should stop the vehicle immediately or take other action to avoid the vehicle or object.

Figure 4:
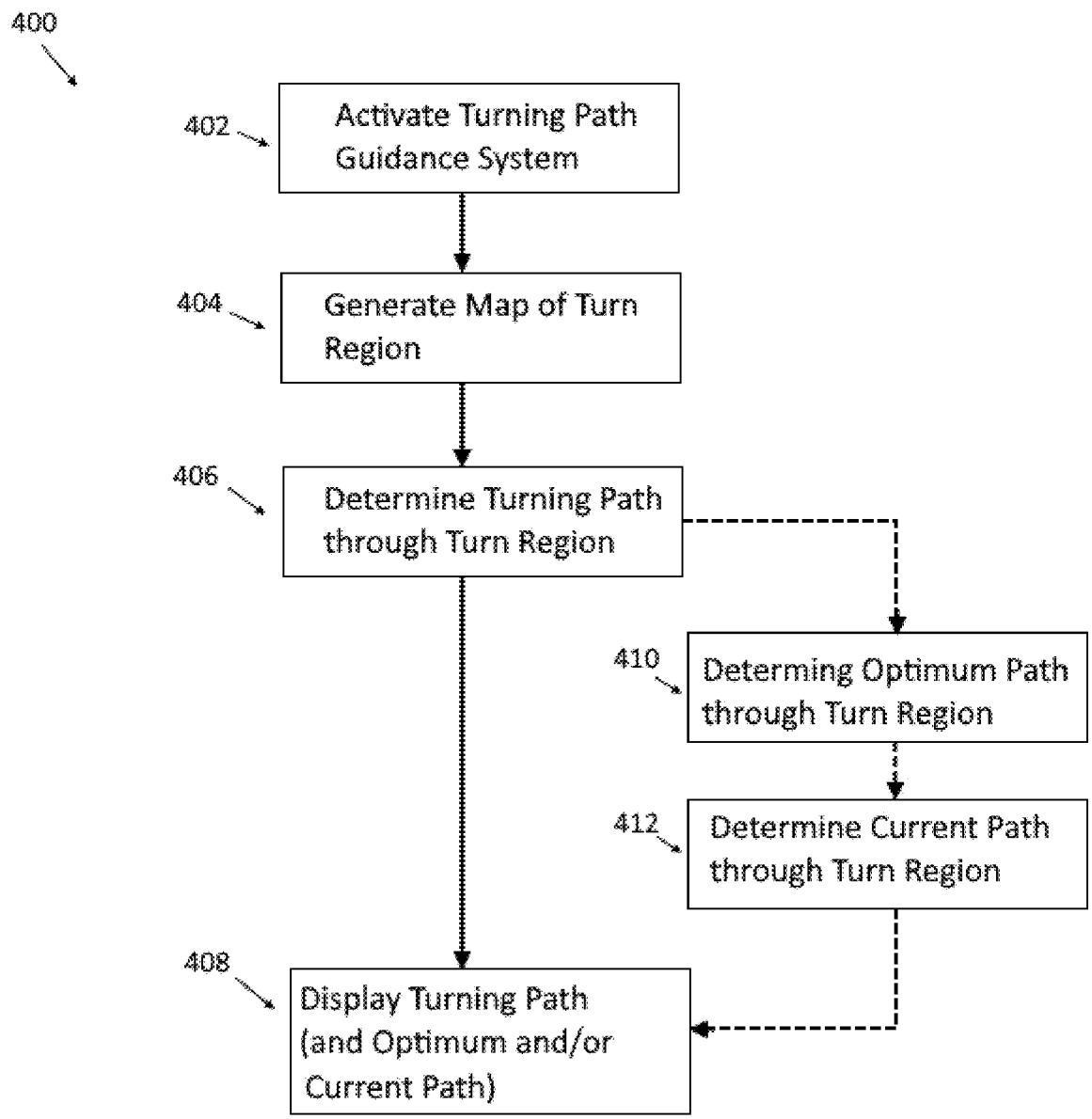
FIG. 4 is a flowchart of a method of providing turning path guidance using the turning path guidance system of FIG. 1.

An exemplary method 400 for operating a vehicle having a turning path guidance system is shown in FIG. 4. The method begins at block 402 with the activation of the turning path guidance system. The system may be activated automatically when the controller 106 determines that the vehicle 102 is approaching a turn. The controller 106 may be determine that the vehicle is approaching a turn based on navigation data from the navigation system 109 and/or based on sensor data from the sensor system 110. Alternatively, the turning path guidance system 108 may be activated by the driver via a user input device, such as a button or touch screen on the display, that is configured to activate the system.

Once the system is activated, at block 404 the controller 106 generates a map of the turn region showing the roadway(s), lanes of the roadways, other vehicles on the roadway, and detected objects in and around the roadway. The controller 106 also determines a turning path for navigating the turn in the turn region at block 406. As discussed above, the turning path 210 is determined based on the current steering angle, the length and width of the vehicle, the distance between the front wheels and the rear wheels, the location of the pivot point between the front wheels and rear wheels in the case of an articulated vehicle, the speed of the vehicle, the current position and orientation of the vehicle, the angle of the turn, the width of the lanes, the swept width of the vehicle, offtrack of the rear wheels with respect to the front wheels, and the positions of other vehicles and objects in and around the turn.

At block 408, the map and the turning path are displayed on the display screen. In one embodiment, as discussed above, the turning path is displayed as a left boundary line corresponding to the left maximum steering angle for navigating the turning path and right boundary line corresponding to the right maximum steering angle. In some embodiments, the optimum path and/or the current path of the vehicle 102 through the turn region may be determined by the controller (blocks 410, 412) in which case an optimum path line and/or a current path line may also be displayed on the display screen (block 408).

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of providing turning path guidance for a vehicle comprising:
   determining parameters of a turn region of a roadway using a controller of a turning path guidance system, the turn region including a turn of the roadway, the parameters including lane data and turning angle data;
   detecting positions of objects in and around the turn region of the roadway using a sensor system of the vehicle;
   determining that the vehicle is within a threshold time from the turn using navigation data from a navigation system of the vehicle;
   generating a map of the turn region based on the lane data and the turning angle data that shows the detected objects using the controller, the map being generated when it is determined that the vehicle is within the threshold time from the turn;
   determining a turning path for the vehicle for navigating the turn of the roadway that avoids the detected objects using the controller, the determining the turning path including determining an optimum path for navigating the vehicle through the turn and determining a left maximum steering angle and a right maximum steering angle that avoid collision with the detected objects; and
   displaying the map on a display screen in the vehicle, a current path line being displayed on the map based on the current steering angle, the turning path being displayed on the map as an optimum path line corresponding to the determined optimum path, a left boundary line that corresponds to the left maximum steering angle, and a right boundary line that corresponds to the right maximum steering angle.

2. The method of claim 1, wherein the detecting of the positions of the objects in and around the roadway using the sensor system of the vehicle further comprises:
   detecting the positions of objects in and around the roadway using at least one of an image sensor, a radar sensor, a LIDAR sensor, and an ultrasonic sensor.

3. The method of claim 1, further comprising:
   generating an alert when a current steering angle is greater than the left maximum steering angle or the right maximum steering angle.

4. The method of claim 1, further comprising:
   generating an alert when one of the detected objects is in the turning path.

5. A turning path guidance system for a vehicle comprising:
   a sensor system on the vehicle configured to detect objects in and around a turn region of a roadway, the turn region including a turn of the roadway;
   a navigation system configured to generate navigation data pertaining to at least one roadway in the turn region;
   a display screen in the vehicle; and
   a controller configured to:
     determine parameters of the turn region including lane data and turning angle data;
     determine that the vehicle is within a threshold time from the turn using navigation data from a navigation system of the vehicle;
     generate a map of the turn region based on the lane data and the turning angle data that shows the detected objects in corresponding positions of the map, the map being generated when it is determined that the vehicle is within the threshold time from the turn;
     determine a turning path for the vehicle for navigating the turn of the roadway that avoids the detected objects, the determining the turning path including determining an optimum path for navigating the vehicle through the turn and determining a left maximum steering angle and a right maximum steering angle that avoid collision with the detected objects; and
     cause the map to be displayed on the display screen, a current path line being displayed on the map based on the current steering angle, the turning path being displayed on the map as an optimum path line corresponding to the determined optimum path, a left boundary line that corresponds to the left maximum steering angle, and a right boundary line that corresponds to the right maximum steering angle.

6. The turning path guidance system of claim 5, wherein the sensor system includes at least one of an image sensor, a radar sensor, a LIDAR sensor, and an ultrasonic sensor.

7. The turning path guidance system of claim 5, wherein the controller is configured to generate an alert when a current steering angle is greater than the left maximum steering angle or the right maximum steering angle.

8. The turning path guidance system of claim 5, wherein the controller is configured to generate an alert when one of the detected objects is in the turning path.

* * * * *